US007248254B2

(12) United States Patent
Kato

(10) Patent No.: US 7,248,254 B2
(45) Date of Patent: Jul. 24, 2007

(54) GAMMA CORRECTING CIRCUIT AND PANEL DRIVE APPARATUS EQUIPPED WITH GAMMA CORRECTING CIRCUIT

(75) Inventor: Fumihiko Kato, Yamagata (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 397 days.

(21) Appl. No.: 10/665,471

(22) Filed: Sep. 22, 2003

(65) Prior Publication Data

US 2004/0056868 A1 Mar. 25, 2004

(30) Foreign Application Priority Data

Sep. 19, 2002 (JP) ............................ 2002-273534

(51) Int. Cl.
*G09G 5/00* (2006.01)
*H04N 5/202* (2006.01)

(52) U.S. Cl. .......................... 345/204; 345/63; 345/77; 345/89; 345/690; 348/254

(58) Field of Classification Search ........ 345/690–693, 345/76–103, 63, 204, 208–210; 348/254
See application file for complete search history.

(56) References Cited

U.S. PATENT DOCUMENTS

2002/0011979 A1* 1/2002 Nitta et al. .................... 345/89
2002/0050970 A1* 5/2002 Kajihara et al. .............. 345/89
2002/0186230 A1* 12/2002 Kudo et al. ................. 345/690

FOREIGN PATENT DOCUMENTS

| | | |
|---|---|---|
| JP | 52-109436 | 2/1976 |
| JP | 60-139007 | 7/1985 |
| JP | 06-348235 | 12/1994 |
| JP | 11-112244 | 4/1999 |
| JP | 2001-166751 | 6/2001 |
| JP | 2002-041004 | 2/2002 |

* cited by examiner

*Primary Examiner*—Lun-Yi Lao
(74) *Attorney, Agent, or Firm*—McGinn IP Law Group, PLLC

(57) ABSTRACT

Each gamma characteristic adjusting unit in a gamma correcting circuit selects a reference voltage from basic voltages generated by a basic voltage generating circuit based on correction adjustment data and selects a reference-voltage output terminal from reference-voltage output terminal candidates of a gamma correction resistor circuit as a target from which the reference voltage is to be output. As double adjustments based on such two-stage selection are possible, the adjustment range for the gamma characteristic can be made wider.

18 Claims, 9 Drawing Sheets

| ADa | | | | ADb | | | |
|---|---|---|---|---|---|---|---|
| 0 | 0 | 1 | 0 | 0 | 0 | 0 | 1 |

GAMMA CORRECTING CIRCUIT AND PANEL DRIVE APPARATUS EQUIPPED WITH GAMMA CORRECTING CIRCUIT

BACKGROUND OF THE INVENTION

1. Field of the Invention

The present invention relates to a gamma correcting circuit which is used at the time of driving panel modules, such as a liquid crystal panel and an electroluminescence panel, which needs adjustment of an applied voltage and optical characteristics.

2. Description of the Related Art

In general, the optical characteristics of panel modules, such as a liquid crystal panel and an electroluminescence panel, have a non-linear light transmission characteristic with respect to an applied voltage. This requires that the drive circuit should drive those panel modules after executing so-called gamma correcting to correct the voltage in such a way as to match with the non-linear light transmission characteristic of the panel modules.

FIG. 1 is a block diagram showing the general structure of a display system. A display panel drive apparatus 105 which drives data lines D0(1) to D0(k) of a display panel 103, includes a gamma correcting circuit 100 and a data-line drive circuit 101. A gray-scale voltage VG which has been corrected in accordance with the characteristics of the panel by the gamma correcting circuit 100 is supplied to the data-line drive circuit 101. The data-line drive circuit 101 receives gray-scale display digital data D of red, green and blue of an image, performs digital-to-analog conversion on the digital data D based on a control signal C1 from a controller 104, yielding gamma-corrected gray-scale voltages or data-line drive output voltages DO(0) to DO(k), and supplies the data-line drive output voltages DO(1) to DO(k) to the display panel 103. The scan-line drive circuit 102 drives the scan lines of the display panel 103 based on a control signal C2 from the controller 104.

FIG. 2 is a characteristic diagram showing the relationship between the gamma-corrected gray-scale display digital data and data-line drive output voltage. Generally, gamma correction is executed in accordance with the characteristics of a panel by individually changing the resistances of the gamma correcting circuit. However, there is a growing demand to facilitate the adjustment of the gamma correction characteristic by controlling gamma correction based on, for example, an adjustment signal or the like from the controller. Japanese Patent Laid-Open No. 2001-166751 discloses a gamma correcting circuit which can adjust the gamma correction characteristic.

FIG. 3 is a circuit diagram of the conventional gamma correcting circuit, disclosed in said Japanese Patent Laid-Open No. 2001-166751 (paragraphs 0037 to 0040 and FIG. 1), which can adjust the gamma correction characteristic. The gamma correcting circuit includes a reference voltage generating circuit 111, voltage adjusting circuits 112(1) to 112(n) and a gamma correction resistor circuit 113. The reference voltage generating circuit 111 generates n reference voltages by dividing a voltage by resistors provided between a high-potential power supply VH and a low-potential power supply VL. Each of the voltage adjusting circuits 112(1) to 112(n) receives an associated reference voltage, adjusts the voltage value upward or downward by causing a desired voltage drop with respect to the reference voltage based on correction adjustment data AD and outputs adjusted reference voltages V(1) to V(n). The gamma correction resistor circuit 113 outputs gray-scale voltages GV(1) to GV(8n+7) approximated to the gamma characteristic of the panel module by means of the resistors provided between the high-potential power supply VH and the low-potential power supply VL. As the outputs of the voltage adjusting circuits 112(1) to 112(n) are supplied to the output terminals for the gray-scale voltages GV(8), GV(16), . . . , and GV(8n) in the gamma correction resistor circuit 113, the correction characteristic of the gamma correction resistor circuit 113 can be adjusted by changing the gray-scale voltages GV(8), GV(16), . . . , and GV(8n) based on the correction adjustment data AD.

FIG. 4 is a characteristic diagram showing the relationship between the gamma-corrected gray-scale display digital data and data-line drive output voltage according to the prior art. As apparent from the illustration, it is possible to easily adjust the correction characteristic of the gamma correction resistor circuit 113 can be adjusted by changing the voltage values of the gray-scale voltages GV(8), GV(16), . . . , and GV(8n) based on the correction adjustment data AD and match the gamma correction characteristic with the characteristics of the panel.

However, the recent diversification of panel modules demands a highly versatile gamma correcting circuit which can adjust the gamma correction characteristic in a wider range than the prior art described in said Japanese Patent Laid-Open No. 2001-166751.

SUMMARY OF THE INVENTION

Accordingly, it is an object of the present invention to provide a highly versatile gamma correcting circuit which can adjust the gamma correction characteristic in a wider range.

A gamma correcting circuit according to the present invention comprises a basic voltage generating circuit which has one end connected to a first high-potential power supply and the other end connected to a first low-potential power supply and generates and outputs a plurality of basic voltages by dividing a voltage difference between a voltage of the first low-potential power supply and a voltage of the first low-potential power supply; a gamma correction resistor circuit having a plurality of resistor elements connected in series between a second high-potential power supply and a second low-potential power supply, and gray-scale voltage output terminals and n (n being a positive integer) reference-voltage output terminal groups, both provided at respective nodes between the resistor elements, each of the n reference-voltage output terminal groups including a maximum of u (u being a positive integer) reference-voltage output terminal candidates; and a gamma correction adjusting circuit having n gamma characteristic adjusting units in association with the n reference-voltage output terminal groups, each of which selects one of a maximum v (v being a positive integer) basic voltages supplied from the basic voltage generating circuit as a reference voltage based on correction adjustment data and selects an output terminal for the selected reference voltage from the maximum of u reference-voltage output terminal candidates included in the associated one of the n reference-voltage output terminal groups based on the correction adjustment data.

Each of the gamma characteristic adjusting units may include a data latch which fetches and latches the correction adjustment data at a predetermined timing; a reference voltage selector which receives a plurality of basic voltages and selects and outputs one of the basic voltages as a reference voltage based on the correction adjustment data latched by the data latch; a node selector which has a first terminal, a second terminal, a switch circuit and a plurality of voltage output terminals that constituting the associated reference-voltage output terminal group and selects, from the voltage output terminals of the associated reference-voltage output terminal group, that reference-voltage output terminal which is connected to the first terminal and the second terminal by the switch circuit, based on the correction adjustment data latched by the data latch; and an operational amplifier having a positive output terminal to which an output of the reference voltage selector is input, a negative output terminal connected to the first terminal and an output terminal connected to the second terminal.

DETAILED DESCRIPTION OF THE PREFERRED EMBODIMENT

Preferred embodiments of the present invention will be described in detail below with reference to the accompanying drawings. The following description illustrates one embodiment of the invention, and in no way restricts the invention to the illustrated embodiment alone.

Figure 5:
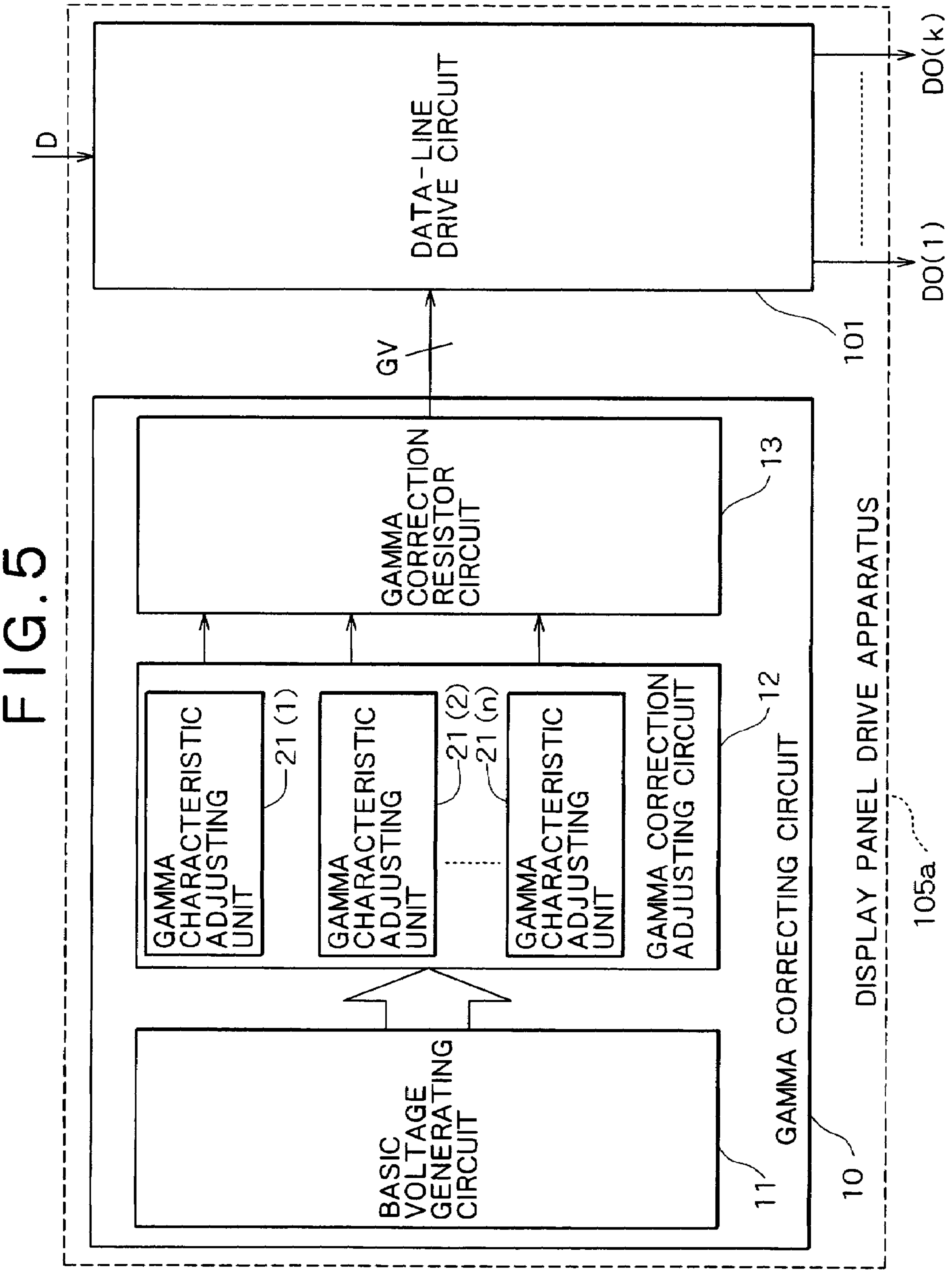
FIG. 5 is a block diagram of a display panel drive apparatus including a gamma correcting circuit according to the present invention.

FIG. 5 is a block diagram of a display panel drive apparatus 105*a* including a gamma correcting circuit according to the invention. The display panel drive apparatus 105*a* has a gamma correcting circuit 10 according to the invention and a data-line drive circuit 101. The gamma correcting circuit 10 is used in place of the conventional gamma correcting circuit 100 shown in FIG. 1. The gamma correcting circuit 10 includes a basic voltage generating circuit 11, a gamma correction adjusting circuit 12 and a gamma correction resistor circuit 13. A gray-scale voltage GV or the output of the gamma correcting circuit 10 is applied to the data-line drive circuit 101 which in turn outputs data-line drive output voltages DO(1) to DO(k) according to gray-scale display digital data D to a display panel.

Figure 6:
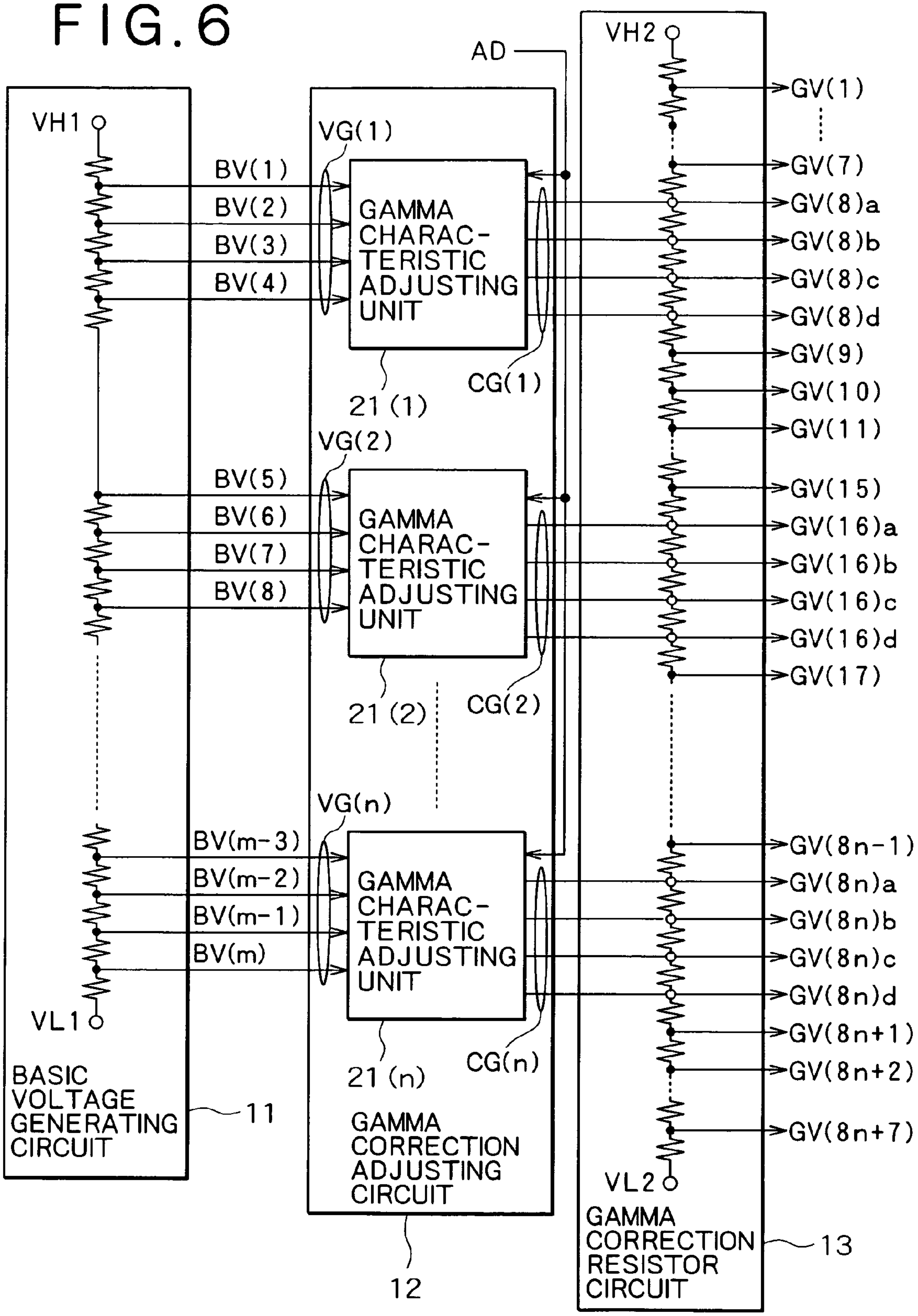
FIG. 6 is a circuit diagram of a gamma correcting circuit according to one embodiment of the invention.

FIG. 6 is a circuit diagram of the gamma correcting circuit 10 according to one embodiment of the invention.

The basic voltage generating circuit 11 has one end connected to a power supply VH1 or a first high-potential power supply and the other end connected to a power supply VL1 or a first low-potential power supply, and generates and outputs m (m being a positive integer) kinds of basic voltages by equally dividing a voltage difference between the voltage of the power supply VH1 and the voltage of the power supply VL1. The basic voltage generating circuit 11 has at least (m−1) resistor elements of the same resistance connected in series between the power supply VH1 and the power supply VL1 and basic voltages are acquired from nodes between the resistor elements.

The gamma correction resistor circuit 13 has a plurality of resistor elements connected in series between a power supply VH2 or a second high-potential power supply and a power supply VL2 or a second low-potential power supply, and output terminals for gray-scale voltages GV(1) to GV(8n+7) and n (n being a positive integer) reference-voltage output terminal groups, both provided at the respective nodes between the resistor elements. Each reference-voltage output terminal group includes a maximum of u (u being a positive integer) reference-voltage output terminal candidates, e.g., GV(8)a to GV(8)d.

The reference-voltage output terminal candidates indicate voltage output terminals included in each reference-voltage output terminal group and one selected from the reference-voltage output terminal candidates becomes a reference-voltage output terminal which actually outputs a reference voltage.

The gamma correction adjusting circuit 12 includes n gamma characteristic adjusting units 21(1) to 21(n). Each gamma characteristic adjusting unit 21(i) selects one of a maximum v (v being a positive integer) basic voltages supplied from the basic voltage generating circuit 11 as a reference voltage based on correction adjustment data AD and selects an output terminal for the selected reference voltage from a maximum of u reference-voltage output terminal candidates included in the associated reference-voltage output terminal group based on the correction adjustment data AD.

While u=4 and v=4 in FIG. 6 for the sake of illustrative and descriptive simplification, the invention is not limited to those settings. The operation of the gamma correcting circuit 10 will now be discussed, paying attention on the action of the gamma characteristic adjusting unit 21(1) in FIG. 6.

A basic voltage group VG(1) composed of four basic voltages BV(1) to BV(4) in m basic voltages BV(1) to BV(m), generated by the basic voltage generating circuit 11, and correction adjustment data AD are input to the gamma characteristic adjusting unit 21(1). Based on the correction adjustment data AD, the gamma characteristic adjusting unit 21(1) selects one of the basic voltages in the basic voltage group VG(1) as a reference voltage and selects one of reference-voltage output terminal candidates GV(8)a to GV(8)d, included in a connection node group CG(1), as the output terminal for the reference voltage. In case where the basic voltage BV(2) and the reference-voltage output terminal candidate GV(8)a are selected based on the correction adjustment data AD, for example, the gamma correcting circuit 10 according to the embodiment outputs the basic voltage BV(2) from the reference-voltage output terminal candidate GV(8)a. As the other gamma characteristic adjusting units 21(2) to 21(n) operate similarly, their description will not be repeated.

Although FIG. 6 shows the voltages of the high-potential side power supply VH1 of the basic voltage generating circuit 11 and the high-potential side power supply VH2 of the gamma correction resistor circuit 13 as different voltages, both voltages may be set equal to each other. Likewise, Although the voltages of the low-potential side power supply VL1 of the basic voltage generating circuit 11 and the low-potential side power supply VL2 of the gamma correction resistor circuit 13 are illustrated as different voltages, they may be set equal to each other.

Figure 3:
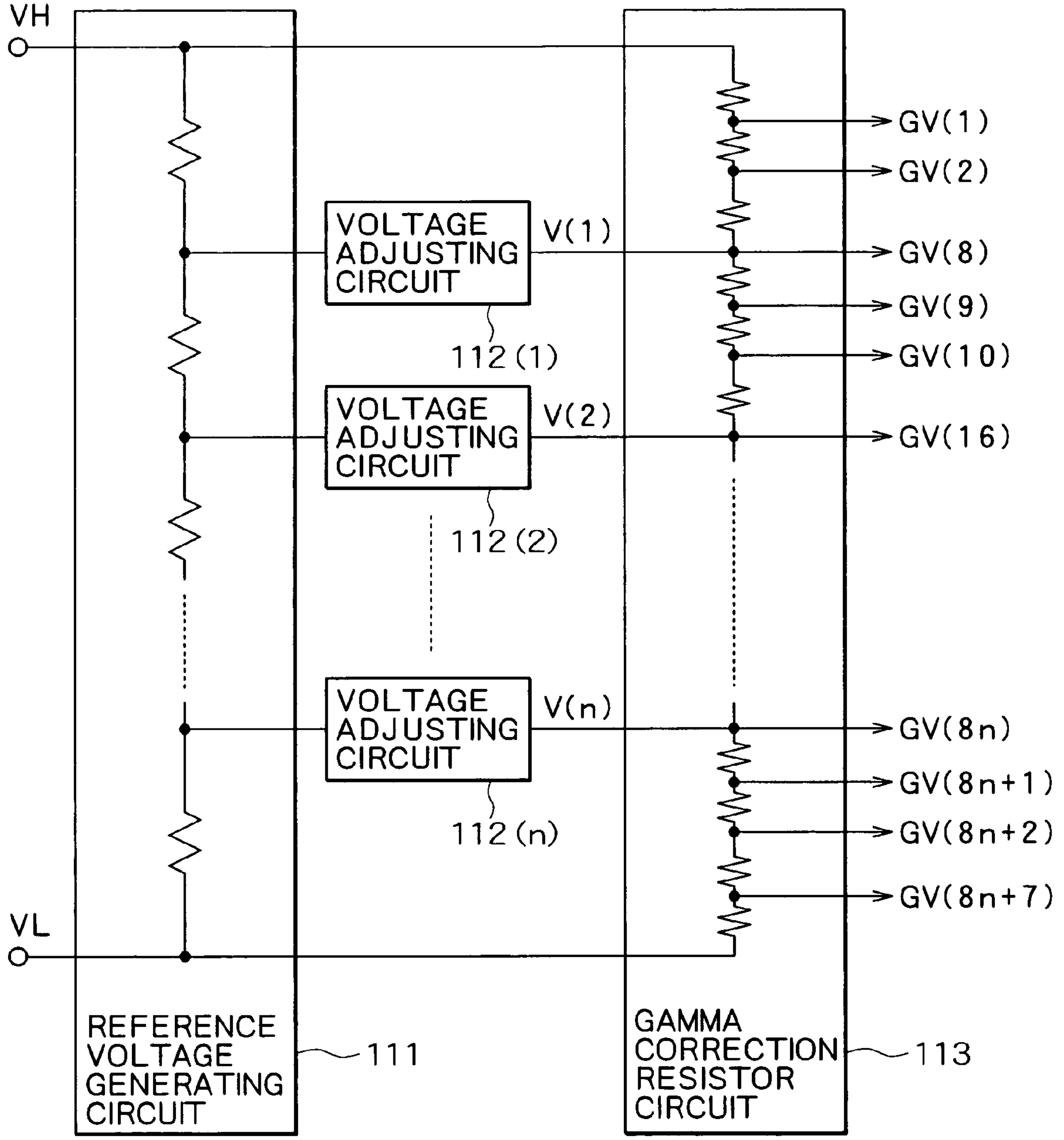
FIG.3 (PRIOR ART)
FIG. 3 is a circuit diagram of a conventional gamma correcting circuit which can adjust the gamma correction characteristic.
Figure 4:
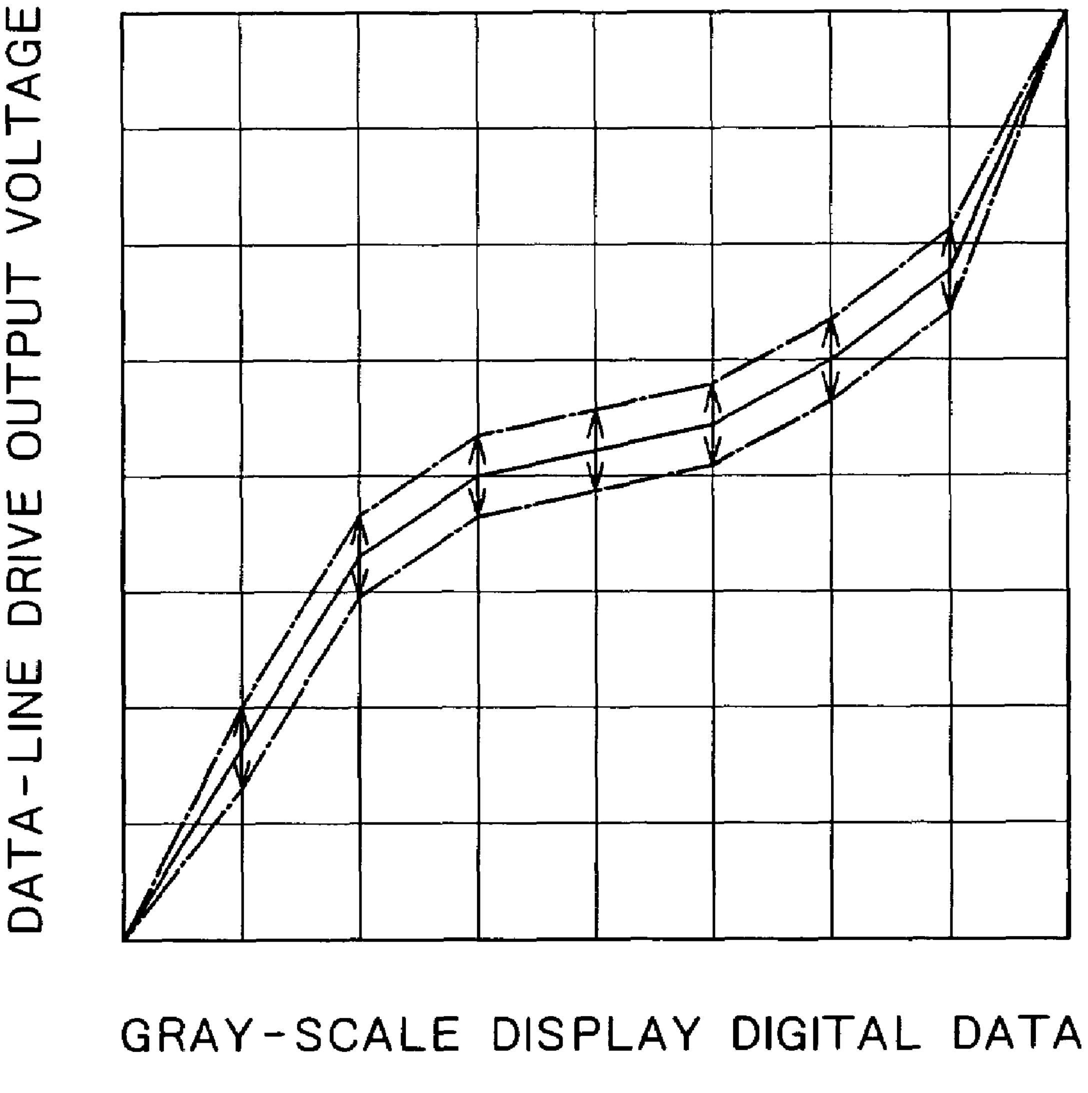
FIG.4 (PRIOR ART)
FIG. 4 is a characteristic diagram showing the relationship between the gamma-corrected gray-scale display digital data and data-line drive output voltage in the prior art in FIG. 3.
Figure 7:
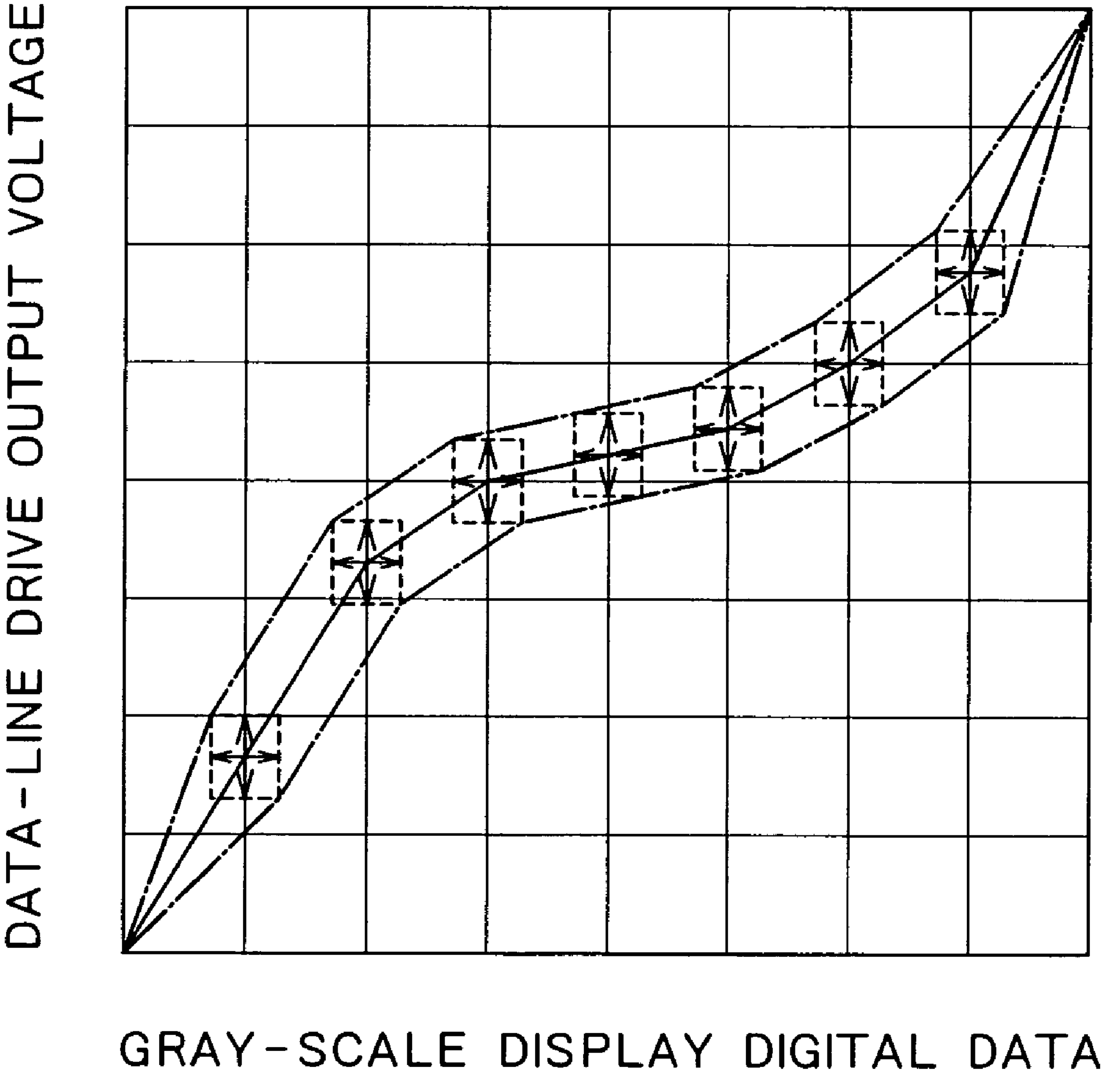
FIG. 7 is a characteristic diagram conceptually showing the adjustment range of gray-scale display digital data v.s. data-line drive output voltage characteristic according to the invention.

The gamma correcting circuit 10 according to the embodiment can perform double adjustments on the same gray-scale display digital data D, i.e, selection of a reference voltage from basic voltages and selection of a reference-voltage output terminal which outputs the reference voltage. FIG. 7 is a characteristic diagram conceptually showing the adjustment range of gray-scale display digital data vs. data-line drive output voltage characteristic according to the embodiment. Referring by comparison to FIG. 3, the reference voltage corresponding to the gray-scale display digital data can be adjusted upward or downward (adjustment along the vertical axis) and the reference-voltage output terminal corresponding to the gray-scale display digital data can be selected (adjustment along the horizontal axis), so that the range of adjustment of the gamma correction characteristic can be widened. This can allow a gamma correcting circuit with the same structure to cope with gamma correction of various kinds of panel modules.

Figures 8A, 8B:
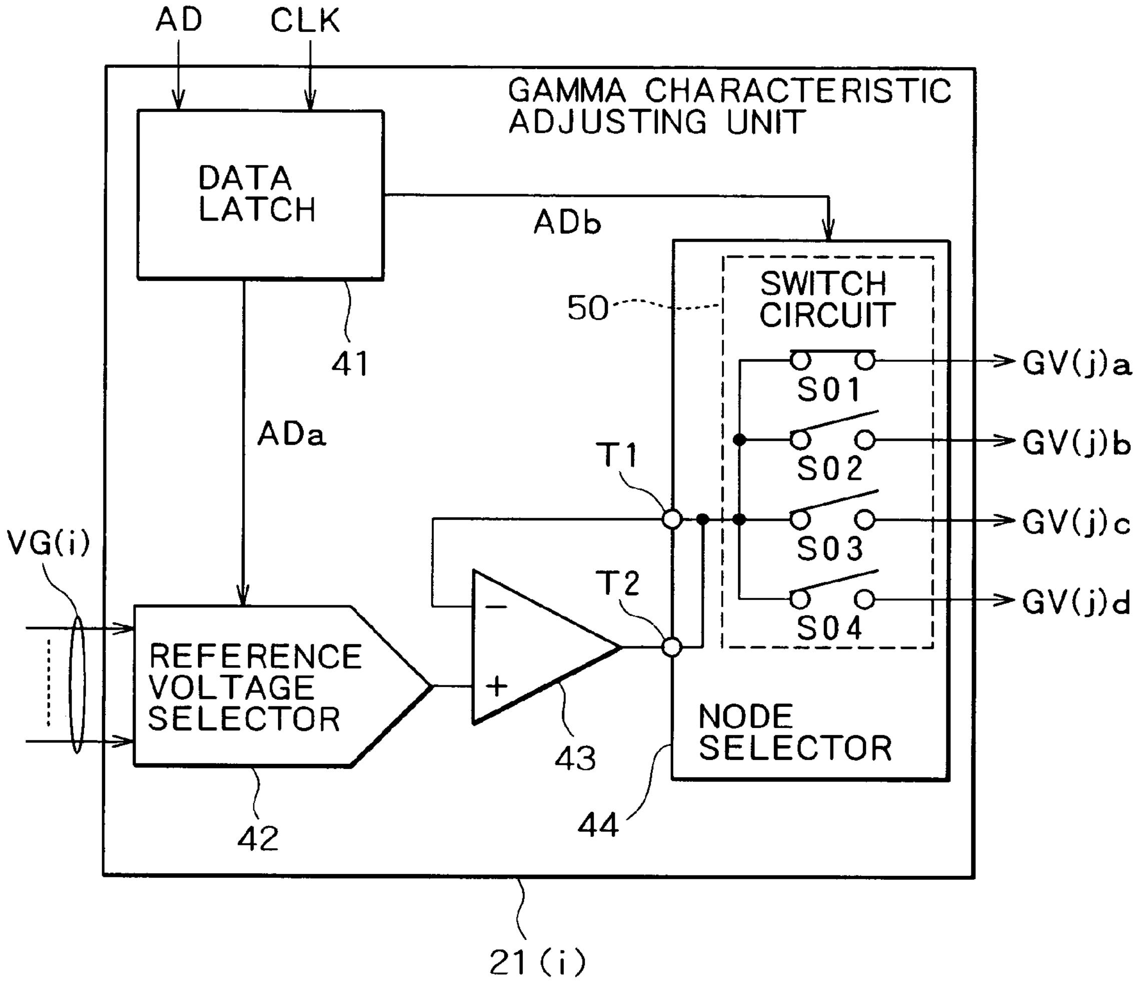
FIG. 8A is a circuit diagram of a first example of a gamma characteristic adjusting unit and FIG. 8B is a diagram showing one example of correction adjustment data.

FIG. 8A is a circuit diagram of the first example of the gamma characteristic adjusting unit 21(i) and FIG. 8B is a diagram showing one example of the correction adjustment data. The gamma characteristic adjusting unit 21(i) comprises a data latch 41, a reference voltage selector 42, an operational amplifier 43 and a node selector 44.

Figure 1:
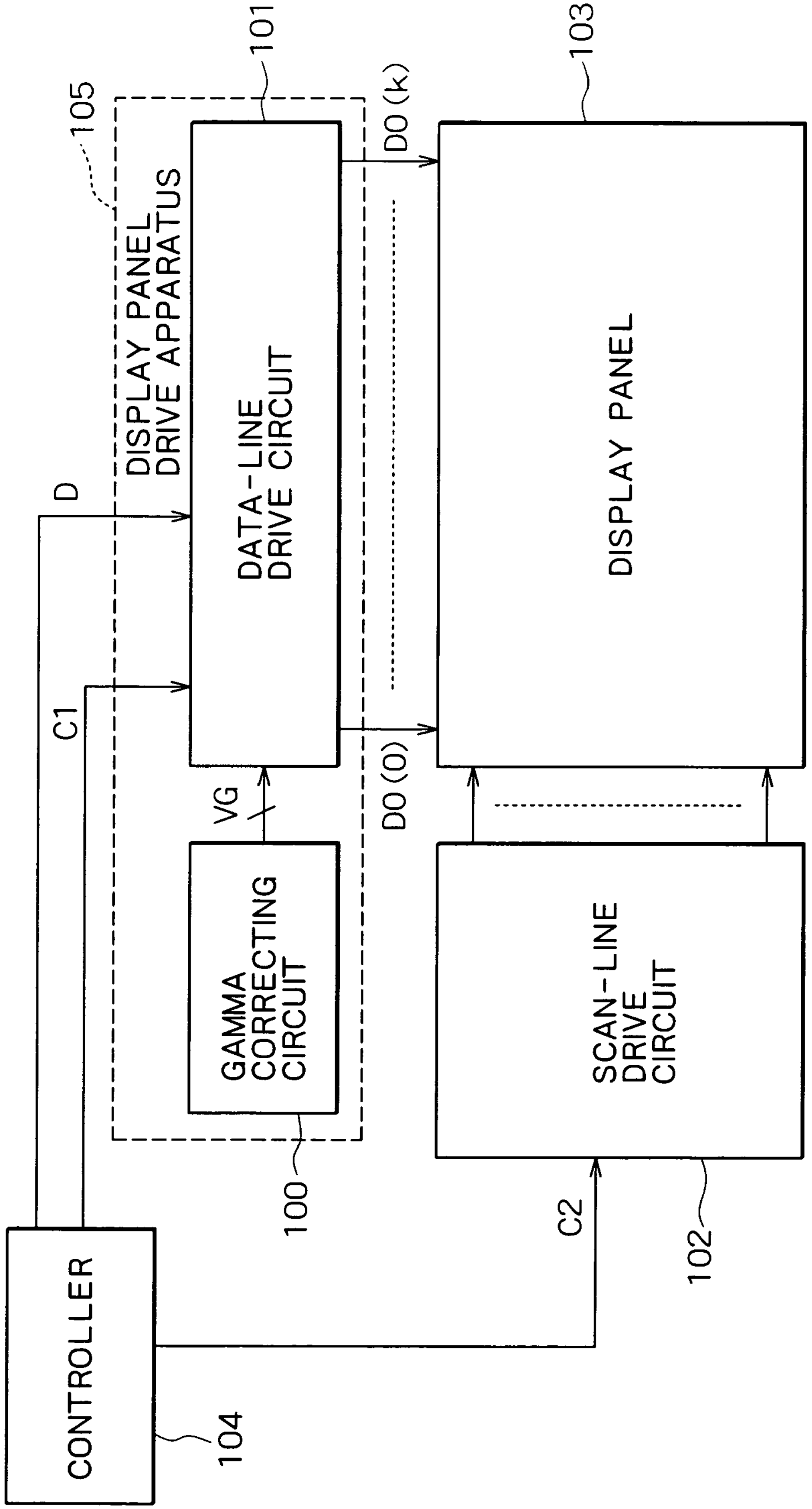
FIG.1 (PRIOR ART)
FIG. 1 is a block diagram showing the general structure of a display system.
Figure 2:
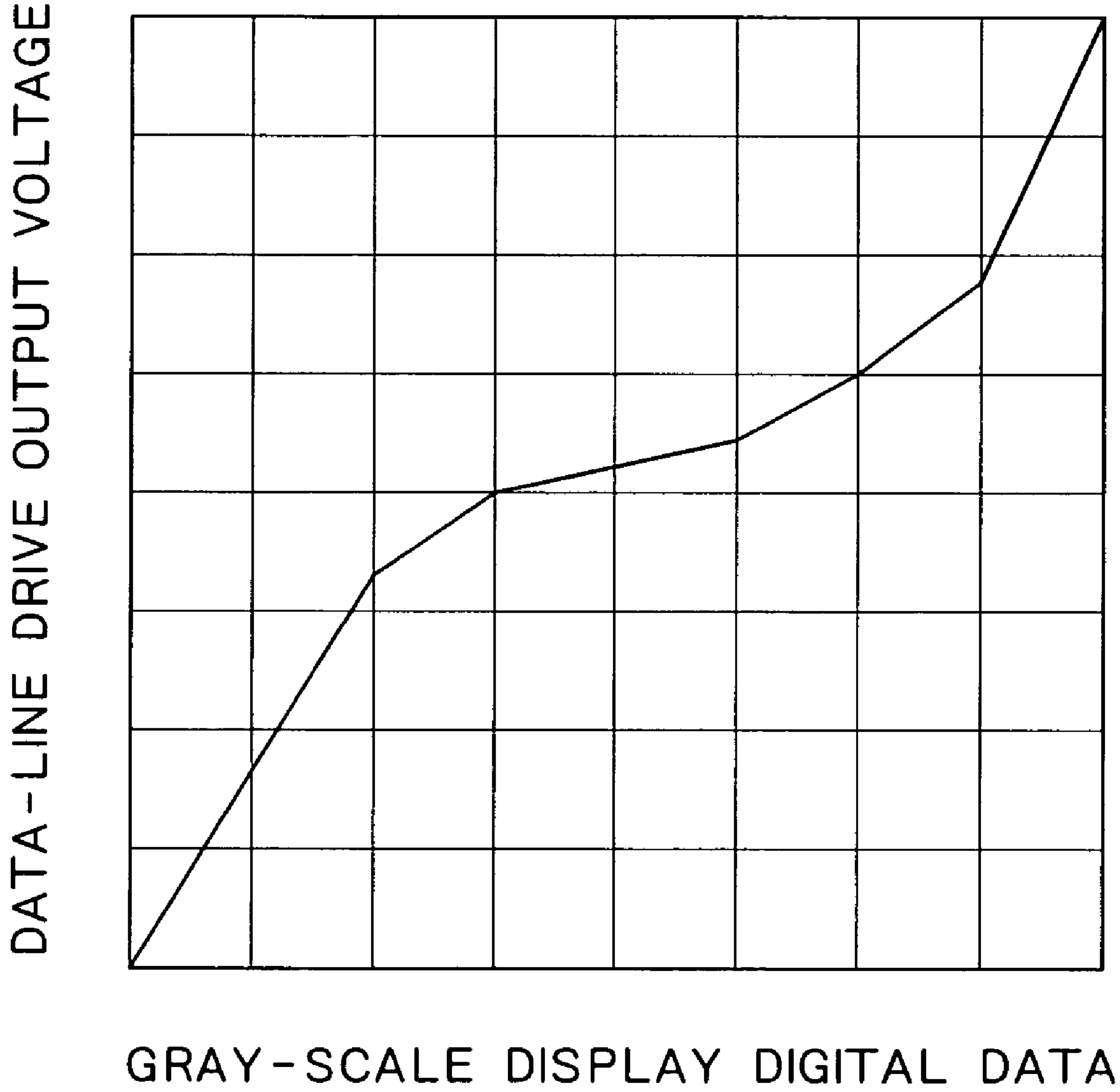
FIG. 2 (PRIOR ART)
FIG. 2 is a characteristic diagram showing the relationship between gamma-corrected gray-scale display digital data and a data-line drive output voltage.

The data latch 41 fetches and latches the correction adjustment data AD, for example, externally input via the controller in FIG. 1, at a predetermined timing of a latch clock CLK. As shown in FIG. 8B, a first predetermined portion ADa of the correction adjustment data AD latched by the data latch 41 is used as selection data for the reference voltage selector 42 and a second predetermined portion ADb of the correction adjustment data AD latched by the data latch 41 is used as selection data for the node selector 44. In case where there are many reference voltages to be input to the reference voltage selector 42 or in case where there are many reference-voltage output terminal candidates to be selected by the node selector 44, it is possible to input the first and second predetermined portions ADa and ADb of the correction adjustment data AD to the data latch 41 in an encoded state, supply the first predetermined portion ADa of the correction adjustment data AD latched by the data latch 41 to the reference voltage selector 42 after decoding the first predetermined portion ADa by using a well-know technique, and likewise supply the second predetermined portion ADb of the correction adjustment data AD latched by the data latch 41 to the node selector 44 after decoding the second predetermined portion ADb.

The reference voltage selector 42 receives a basic voltage group VG(i) including a plurality of basic voltages and selects and outputs one of the basic voltages in the basic voltage group VG(i) as a reference voltage based on the first predetermined portion ADa of the correction adjustment data AD latched by the data latch 41.

The node selector 44 has a first terminal T1, a second terminal T2, a switch circuit 50 including a plurality of switches S01 to S04 and reference-voltage output terminal candidates GV(j)a to GV(j)d equal in number to the switches S01 to S04. Based on the first predetermined portion ADa of the correction adjustment data AD latched by the data latch 41, a selected switch in the switch circuit 50 is closed and that reference-voltage output terminal candidate which is electrically connected to the first terminal T1 and second terminal T2 is selected.

The operational amplifier 43 has a positive input terminal to which the output of the reference voltage selector 42 is input, a negative input terminal connected to the first terminal T1 and an output terminal connected to the second terminal T2.

In the first example of the gamma characteristic adjusting unit 21(i) shown in FIGS. 8A and 8B, the reference voltage selector 42 selects one of the basic voltages in the basic voltage group VG(i) as a reference voltage. The selected reference voltage is subjected to impedance conversion by the operational amplifier 43 and the converted reference voltage is then output from the selected reference-voltage output terminal candidate GV(j)a via the selected switch S01 in the switch circuit 50 in the node selector 44.

Figure 9:
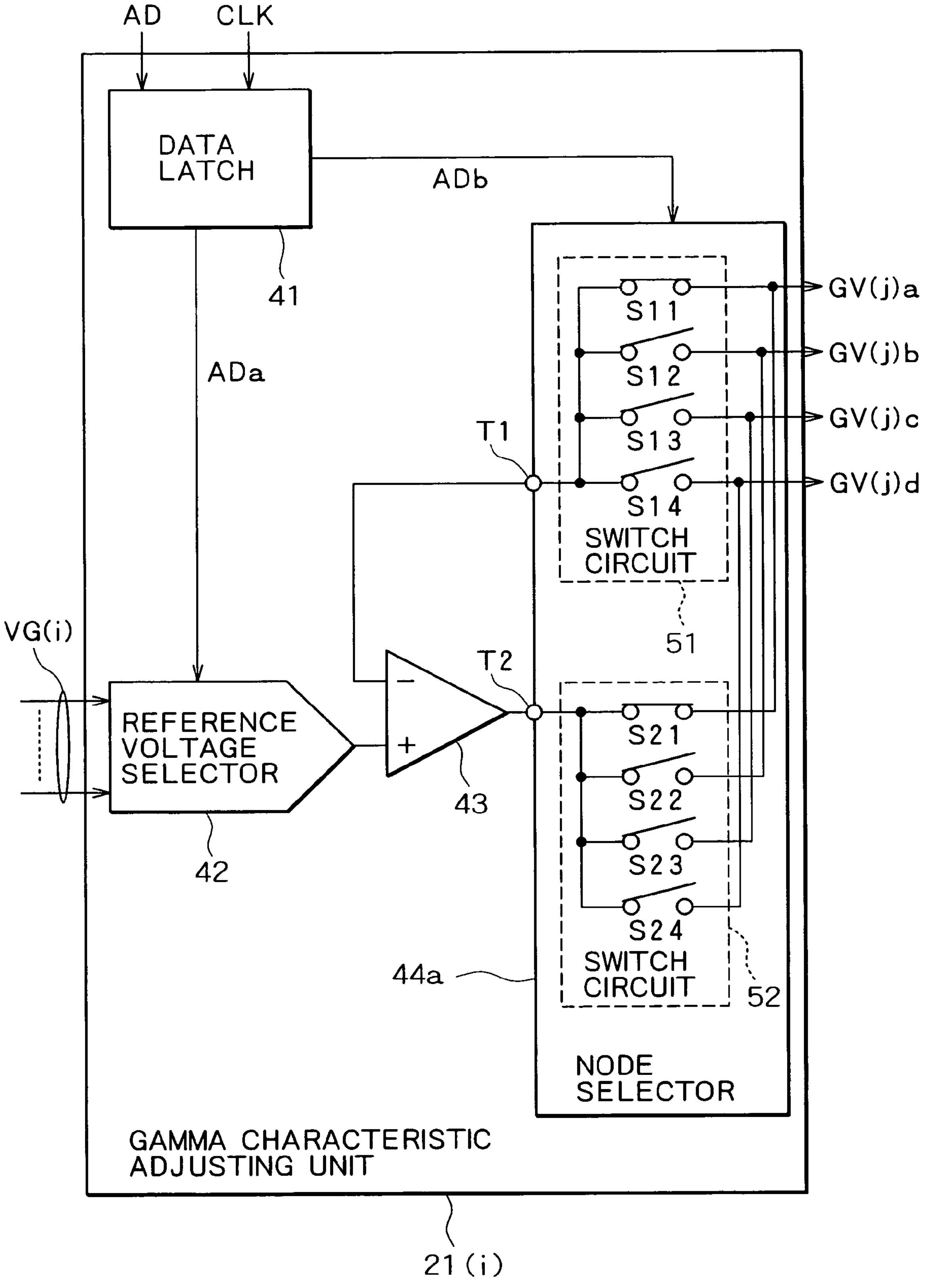
FIG. 9 is a circuit diagram of a second example of the gamma characteristic adjusting unit.

FIG. 9 is a circuit diagram of the second example of the gamma characteristic adjusting unit 21(i). The second example differs from the first example in FIG. 8A in that its node selector 44*a* comprises two switch circuits. That is, the node selector 44*a* has a first switch circuit 51 and a second switch circuit 52.

The first switch circuit 51 includes switches S11 to S14 whose one ends are connected together to the first terminal T1 and other ends are connected to the respective reference-voltage output terminal candidates.

The second switch circuit 52 includes switches S21 to S24 provided in association with the switches S11 to S14 of the first switch circuit 51 and equal in number to the switches S11 to S14. The switches S21 to S24 have one ends connected together to the second terminal T2 and other ends connected to the other ends of the associated switches in the first switch circuit 51.

One switch, e.g., S11, in the switches S11 to S14 of the first switch circuit 51 is selected and closed based on the second predetermined portion ADb of the correction adjustment data AD, and the associated switch S21 in the second switch circuit 52 is closed at the same time.

As in the operation of the first example in FIG. 8A in the embodiment, the reference voltage selector 42 selects one of the basic voltages in the basic voltage group VG(i) as a reference voltage, the operational amplifier 43 performs impedance conversion on the selected reference voltage and the resultant reference voltage is then output from the selected reference-voltage output terminal candidate GV(j)a via the selected switch S21 in the second switch circuit 52 in the node selector 44*a*.

In the first example in FIG. 8A, as the first terminal T1 and the second terminal T2 are connected together to have the same potential in the node selector 44, the output terminal and negative input terminal of the operational amplifier 43 are short-circuited. In the second example, by way of contrast, the first terminal T1 and the second terminal T2 are not connected together in the node selector 44*a* and the output terminal of the operational amplifier 43 is connected via the second terminal T2 to the second switch circuit 52 while the negative input terminal of the operational amplifier 43 is connected via the first terminal T1 to the first switch circuit 51. In case where the switch in the node selector 44 of the first example in FIG. 8A which has been selected and closed does not have a low ON resistance, therefore, the current flows from the gamma correction resistor circuit 13 to the switch, causing a voltage drop at the switch. This voltage drop may result in a voltage difference between the value of the reference voltage to be output to the selected reference-voltage output terminal and the value of the reference voltage selected by the reference voltage selector 42. To avoid this shortcoming, it is necessary to design the ON resistance of each switch in the node selector 44 sufficiently low in the first example in FIG. 8A.

In the node selector 44*a* of the second example in FIG. 9, by way of contrast, the switch to be connected to the negative input terminal of the operational amplifier 43 and the switch to be connected to the output terminal of the operational amplifier 43 are different from each other, so that the current does not flow from the gamma correction resistor circuit 13 to the negative input terminal of the operational amplifier 43 even in case where the ON resistance of the switch is not low. Accordingly, there does not occur a voltage difference between the value of the reference voltage to be output to the selected reference-voltage output terminal and the value of the reference voltage selected by the reference voltage selector 42. This makes it easier to design the resistances of the switches. In addition, the elimination of the error factor can ensure high-precision adjustment.

As apparent from the above, the invention can ensure double adjustments on the same gray-scale display digital data D by two-stage selection, i.e., selection of a reference voltage from basic voltages and selection of a reference-voltage output terminal which outputs the reference voltage, thus making it possible to widen the adjustment range for the gamma characteristic. This can allow a gamma correcting circuit with the same structure to cope with gamma correction of various kinds of panel modules and can thus provide a gamma correcting circuit with higher versatility than the prior art.

What is claimed is:

1. A gamma correcting circuit comprising:

a basic voltage generating circuit which has one end connected to a first high-potential power supply and the other end connected to a first low-potential power supply and generates and outputs a plurality of basic voltages by dividing a voltage difference between a voltage of said first high-potential power supply and a voltage of said first low-potential power supply;

a gamma correction resistor circuit having a plurality of resistor elements connected in series between a second high-potential power supply and a second low-potential power supply, and gray-scale voltage output terminals and n (n being a positive integer >1) reference-voltage output terminal groups, both provided at respective nodes between said resistor elements, each of said n reference-voltage output terminal groups including a maximum of u (u being a positive integer >1) reference-voltage output terminal candidates; and a gamma correction adjusting circuit having n gamma characteristic adjusting units in association respectively with said n reference-voltage output terminal groups, each of said n gamma characteristic adjusting units selects one of a maximum v (v being a positive integer >1) basic voltages supplied from said basic voltage generating circuit as a reference voltage based on correction adjustment data and selects an output terminal for said selected reference voltage from said maximum of u reference-voltage output terminal candidates included in the associated one of said n reference-voltage output terminal groups based on said correction adjustment data, said gamma characteristic adjusting units each comprising:

a data latch which fetches and latches said correction adjustment data at a predetermined timing;

a reference voltage selector which receives a plurality of basic voltages and selects and outputs one of said basic voltages as a reference voltage based on said correction adjustment data latched by said data latch;

a node selector which has a first terminal, a second terminal, a switch circuit and a plurality of voltage output terminals that comprise the associated reference-voltage output terminal group and selects, from said voltage output terminals of said associated reference-voltage output terminal group, the reference-voltage output terminal which is connected to said first terminal and said second terminal by said switch circuit, based on said correction adjustment data latched by said data latch; and an operational amplifier having a positive input terminal to which an output of said reference voltage selector is input, a negative output terminal connected to said first terminal and an output terminal connected to said second terminal.

2. The gamma correcting circuit according to claim 1, wherein said basic voltage generating circuit has a plurality of resistor elements connected in series between said first high-potential power supply and said first low-potential power supply and outputs individual basic voltages from nodes between those resistor elements.

3. A display panel drive apparatus having a gamma correcting circuit as recited in claim 2.

4. The gamma correcting circuit according to claim 1, wherein said reference voltage selector selects a reference voltage based on a first predetermined portion of said correction adjustment data latched by said data latch and said node selector selects a reference-voltage output terminal based on a second predetermined portion of said correction adjustment data.

5. A display panel drive apparatus having a gamma correcting circuit as recited in claim 4.

6. The gamma correcting circuit according to claim 1, wherein said switch circuit of said node selector includes a plurality of switches having ends connected together to said first terminal and said second terminal and other ends connected to respective voltage output terminals of the associated reference-voltage output terminal group and enables the one of said switches which is selected based on said correction adjustment data.

7. A display panel drive apparatus having a gamma correcting circuit as recited in claim 6.

8. The gamma correcting circuit according to claim 1, wherein said node selector has:

a first switch circuit including a plurality of switches having ends connected together to said first terminal and other ends connected to respective voltage output terminals of the associated reference-voltage output terminal group; and a second switch circuit including a plurality of switches provided in association with said switches of said first switch circuit, equal in number to said switches of said first switch circuit and having ends connected together to said second terminal and other ends respectively connected to said other ends of said switches of said first switch circuit, and enables that one of said switches of said first switch circuit which is selected based on said correction adjustment data and that one of said switches of said second switch circuit which is associated with said selected switch.

9. A display panel drive apparatus having a gamma connecting circuit as recited in claim 8.

10. A display panel drive apparatus having a gamma correcting circuit as recited in claim 1.

11. A display panel drive apparatus having a gamma correcting circuit as recited in claim 1.

12. The gamma correcting circuit according to claim 1, wherein the first and second low-potential power supplies supply power greater than zero.

13. A display panel drive apparatus comprising:

a data-line drive circuit provided with a gray voltage; and a gamma correcting circuit in electrical communication with the data-line drive circuit providing the gray voltage and comprising:

a basic voltage generating circuit which has one end connected to a first high-potential power supply and the other end connected to a first low-potential power supply and generates and outputs a plurality of basic voltages by dividing a voltage difference between a voltage of said first high-potential power supply and a voltage of said first low-potential power supply;

a gamma correction resistor circuit having a plurality of resistor elements connected in series between a second high-potential power supply and a second low-potential power supply, and gray-scale voltage output terminals and n (n being a positive integer >1) reference-voltage output terminal groups, both provided at respective nodes between said resistor elements, each of said n reference-voltage output terminal groups including a maximum of u (u being a positive integer >1) reference-voltage output terminal candidates; and a gamma correction adjusting circuit having n gamma characteristic adjusting units in association with said n reference-voltage output terminal groups, each of which selects one of a maximum v (v being a positive integer >1) basic voltages supplied from said basic voltage generating circuit as a reference voltage based on correction adjustment data and selects an output terminal for said selected reference voltage from said maximum of u reference-voltage output terminal candidates included in the associated one of said n reference-voltage output terminal groups based on said correction adjustment data, said gamma characteristic adjusting units each comprising:

a data latch which fetches and latches said correction adjustment data at a predetermined timing;

a reference voltage selector which receives a plurality of basic voltages and selects and outputs one of said basic voltages as a reference voltage based on said correction adjustment data latched by said data latch;

a node selector which has a first terminal, a second terminal, a switch circuit and a plurality of voltage output terminals tat constituting the associated reference-voltage output terminal group and selects, from said voltage output terminals of said associated reference-voltage output terminal group, that reference-voltage output terminal which is connected to said first terminal and said second terminal by said switch circuit, based on said correction adjustment data latched by said data latch; and an operational amplifier having a positive output terminal to which an output of said reference voltage selector is input, a negative output terminal connected to said first terminal and an output terminal connected to said second terminal.

14. The display panel drive apparatus according to claim 13, wherein said basic voltage generating circuit has a plurality of resistor elements connected in series between said first high-potential power supply and said first low-potential power supply and outputs individual basic voltages from nodes between those resistor elements.

15. The display panel drive apparatus according to claim 13, wherein said reference voltage selector selects a reference voltage based on a first predetermined portion of said correction adjustment data latched by said data latch and said node selector selects a reference-voltage output terminal based an a second predetermined portion of said correction adjustment data.

16. The display panel drive apparatus according to claim 13, wherein said switch circuit of said node selector includes a plurality of switches having ends connected together to said first terminal and said second terminal and other ends connected to respective voltage output terminals of the associated reference-voltage output terminal group and enables that one of said switches which is selected based on said correction adjustment data.

17. The display panel drive apparatus according to claim 13, wherein said node selector has:

a first switch circuit including a plurality of switches having ends connected together to said first terminal and other ends connected to respective voltage output terminals of the associated reference-voltage output terminal group; and a second switch circuit including a plurality of switches provided in association with said switches of said first switch circuit, equal in number to said switches of said first switch circuit and having one ends connected together to said second terminal and other ends respectively connected to said other ends of said switches of said first switch circuit, and enables that one of said switches of said first switch circuit which is selected based on said correction adjustment data and that one of said switches of said second switch circuit which is associated with said selected switch.

18. The display panel drive apparatus according to claim 13, wherein the first and second low-potential power supplies supply power greater than zero.

* * * * *